(12) United States Patent
Saeki et al.

(10) Patent No.: US 8,711,515 B2
(45) Date of Patent: Apr. 29, 2014

(54) STOPPER, MOTOR, AND DISK DRIVE APPARATUS

(71) Applicant: Nidec Corporation, Kyoto (JP)

(72) Inventors: Shintaro Saeki, Kyoto (JP); Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/767,194

(22) Filed: Feb. 14, 2013

(65) Prior Publication Data

US 2014/0063653 A1    Mar. 6, 2014

Related U.S. Application Data

(60) Provisional application No. 61/695,374, filed on Aug. 31, 2012.

(51) Int. Cl.
*G11B 17/02* (2006.01)
*H02K 7/00* (2006.01)

(52) U.S. Cl.
USPC .................... 360/99.08; 720/696; 310/90

(58) Field of Classification Search
USPC ............. 360/99.08, 98.07; 720/696; 310/90, 310/67 R
See application file for complete search history.

(56) References Cited

U.S. PATENT DOCUMENTS

| | | | |
|---|---|---|---|
| 7,012,191 B1 | 3/2006 | Watanabe et al. | |
| 7,265,939 B2 * | 9/2007 | Kuwajima et al. | 360/99.08 |
| 8,120,872 B2 | 2/2012 | Sekii et al. | |
| 8,363,352 B2 | 1/2013 | Kang | |
| 8,370,868 B2 * | 2/2013 | Smirnov et al. | 720/696 |
| 8,484,669 B2 * | 7/2013 | Smirnov et al. | 720/697 |
| 8,587,896 B1 * | 11/2013 | Ishino et al. | 360/99.08 |
| 8,593,759 B1 * | 11/2013 | Matsumoto et al. | 360/99.08 |
| 2006/0138886 A1 | 6/2006 | Ito et al. | |
| 2006/0265871 A1 | 11/2006 | Ito et al. | |
| 2007/0247010 A1 | 10/2007 | Ichizaki | |

(Continued)

FOREIGN PATENT DOCUMENTS

JP    05-207717 A    8/1993
JP    05-070184 U    9/1993

(Continued)

OTHER PUBLICATIONS

Sekii et al., "Motor and Disk Drive Apparatus", U.S. Appl. No. 13/564,934, filed Aug. 2, 2012.

(Continued)

*Primary Examiner* — Angel Castro
(74) *Attorney, Agent, or Firm* — Keating & Bennett, LLP

(57) ABSTRACT

A motor includes a stator and a rotor including a disk portion, a cylindrical portion, and a stopper. The stopper includes a stopper protruding portion and is fixed to an inner surface of the cylindrical portion. The cylindrical portion includes a cylindrical portion protruding portion that opposes an outer surface of the stopper. Adhesive is included between the cylindrical portion and the stopper. A gap between an upper end portion of the outer surface of the stopper and an inner peripheral surface of the cylindrical portion protruding portion defines a first tapered gap. A gap between a lower end portion of the outer surface of the stopper and an inner peripheral surface of the cylindrical portion defines a second tapered gap. The adhesive is included in the first tapered gap and the second tapered gap. The stator includes an annular or substantially annular surface below the second tapered gap.

21 Claims, 5 Drawing Sheets

(56) References Cited

U.S. PATENT DOCUMENTS

| | | |
|---|---|---|
| 2007/0278880 A1 | 12/2007 | Wada et al. |
| 2008/0019038 A1 | 1/2008 | Xu et al. |
| 2008/0084142 A1 | 4/2008 | Ino et al. |
| 2009/0256432 A1* | 10/2009 | Kim et al. ............... 310/46 |
| 2010/0177627 A1 | 7/2010 | Ino et al. |
| 2011/0069416 A1* | 3/2011 | Kang ..................... 360/274 |
| 2011/0169361 A1* | 7/2011 | Park ...................... 310/91 |
| 2012/0025647 A1* | 2/2012 | Yoo et al. ............... 310/90 |
| 2012/0200957 A1 | 8/2012 | Yawata |

FOREIGN PATENT DOCUMENTS

| | | | |
|---|---|---|---|
| JP | 05-316704 | A | 11/1993 |
| JP | 06-343242 | A | 12/1994 |
| JP | 08-033253 | A | 2/1996 |
| JP | 08-237899 | A | 9/1996 |
| JP | 08-275439 | A | 10/1996 |
| JP | 10-108424 | A | 4/1998 |
| JP | 2003-153481 | A | 5/2003 |
| JP | 2005-253239 | A | 9/2005 |
| JP | 2007-295666 | A | 11/2007 |
| JP | 2008-005588 | A | 1/2008 |
| JP | 2008-092714 | A | 4/2008 |
| JP | 2009-110611 | A | 5/2009 |
| JP | 2011-114892 | A | 6/2011 |
| JP | 2012-005339 | A | 1/2012 |

OTHER PUBLICATIONS

Saeki et al., "Spindle Motor and Disk Drive Apparatus", U.S. Appl. No. 13/767,228, filed Feb. 14, 2013.
Saeki et al.,"Base Unit", U.S. Appl. No. 13/770,374, filed Feb. 19, 2013.
Fujinawa et al., "Base Member, Motor, and Disk Drive Apparatus", U.S. Appl. No. 13/770,395, filed Feb. 19, 2013.
Matsumoto et al., "Base Unit, Motor and Disk Drive Apparatus", U.S. Appl. No. 13/770,355, filed Feb. 19, 2013.
Tamaoka et al., "Motor and Disk Drive Apparatus", U.S. Appl. No. 13/564,900, filed Aug. 2, 2012.
Masumi et al., "Base Plate, Base Unit, Motor, Disk Drive Apparatus and Method of Manufacturing the Base Plate", U.S. Appl. No. 13/789,974, filed Mar. 8, 2013.
Tatsumi et al., "Base Plate, Base Unit, Motor and Disk Drive Apparatus", U.S. Appl. No. 13/788,140, filed Mar. 7, 2013.
Shiraishi et al., "Motor and Disk Drive Apparatus", U.S. Appl. No. 13/783,733, filed Mar. 4, 2013.
Sato et al., "Spindle Motor and Disk Drive Apparatus", U.S. Appl. No. 13/780,447, filed Feb. 28, 2013.
Matsumoto et al., "Spindle Motor and Disk Drive Apparatus", U.S. Appl. No. 13/792,448, filed Mar. 11, 2013.
Matsumoto et al., "Spindle Motor and Disk Drive Apparatus", U.S. Appl. No. 13/792,400, filed Mar. 11, 2013.
Matsumoto et al., "Base Unit, Motor and Disk Drive Apparatus", U.S. Appl No. 13/785,194, filed Mar. 5, 2013.
Matsumoto et al.,"Spindle Motor and Disk Drive Apparatus", U.S. Appl. No. 13/798,842, filed Mar. 13, 2013.
Sato et al., "Spindle Motor and Disk Drive Apparatus", U.S. Appl. No. 13/798,827, filed Mar. 13, 2013.
Ishino et al., "Motor and Disk Drive Apparatus", U.S. Appl. No. 13/794,864, filed Mar. 12, 2013.

* cited by examiner

STOPPER, MOTOR, AND DISK DRIVE APPARATUS

BACKGROUND OF THE INVENTION

1. Field of the Invention

The present invention relates to a coming-off prevention structure used in a motor.

2. Description of the Related Art

Hitherto, in a disk drive apparatus such as a hard disk drive apparatus, a spindle motor (hereinafter, motor) that rotates a disk is mounted. The disk drive apparatus has a disk, a housing, a stator, an FPC (Flexible Printed Circuit), and the like. The housing has a cover member, a base portion, and the like.

In recent years, there is a demand for further reductions in the thickness and size of the disk drive apparatus. Particularly, in order to further reduce the thickness of disk drive apparatuses belonging to a small size type of 2.5-inches and 7 mm-thick from among disk drive apparatuses, the housing or the motor itself disposed in the housing needs to be made thin.

On the other hand, when the motor itself is thinned, an effect of an external impact on the motor during motor driving is increased. Particularly, when the rotor moves in an axial direction to be distant from the stator due to the impact or the like, a bearing mechanism is not able to sufficiently support a shaft. Therefore, the rotor needs a coming-off prevention structure (i.e., a stopper). However, depending on the coming-off structure, the dimensions in the axial direction of the motor have to be increased, and thus there is a concern that reductions in the size and thickness of the motor may be impeded.

Therefore, a coming-off structure that realizes reductions in the size and thickness of a motor is needed.

SUMMARY OF THE INVENTION

A motor according to a preferred embodiment of the present invention includes a stator; and a rotor which is arranged to rotate relative to the stator about a center axis as a center. The rotor includes a disk portion, a cylindrical portion, and a stopper. The cylindrical portion extends downward in an axial direction from the disk portion. The stopper preferably is cylindrical or substantially cylindrical. The stopper is disposed on an inner side in a radial direction of the cylindrical portion and is fixed to an inner surface of the cylindrical portion. The cylindrical portion includes a cylindrical portion protruding portion. The cylindrical portion protruding portion protrudes inward in the radial direction and opposes an outer surface of the stopper in the radial direction. The stopper includes a stopper protruding portion. The stopper protruding portion protrudes outward in the radial direction, opposes the inner surface of the cylindrical portion, and opposes the protruding portion in the axial direction. An adhesive is included between the cylindrical portion and the stopper. A gap between an upper end portion of the outer surface of the stopper and an inner peripheral surface of the cylindrical portion protruding portion corresponding to this in the radial direction defines a first tapered gap. In the first tapered gap, a gap in the radial direction widens upward in the axial direction. A gap between a lower end portion of the outer surface of the stopper protruding portion and an inner peripheral surface of the cylindrical portion opposing this in the radial direction defines a second tapered gap. In the second tapered gap, a gap in the radial direction widens downward in the axial direction. The adhesive is included in at least a portion of the first tapered gap and in at least a portion of the second tapered gap. The stator includes an annular surface that widens in the radial direction. The annular surface is positioned below the second tapered gap. The second tapered gap opposes the annular surface in the axial direction.

According to preferred embodiments of the present invention, even in a case where the rotor moves in the axial direction due to an external impact or the like, the rotor is controlled such that it may be prevented from being separated from the stationary section.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side in FIG. 1 in the center axis direction of a motor is simply called an "upper side" and the lower side therein is simply called a "lower side". In addition, the vertical direction does not represent a positional relationship or a direction during actual assembly into a device. In addition, a direction parallel or substantially parallel to the center axis is called an "axial direction", a radial direction about the center axis as the center is simply called a "radial direction", and a circumferential direction about the center axis as the center is simply called a "circumferential direction".

Figure 1:
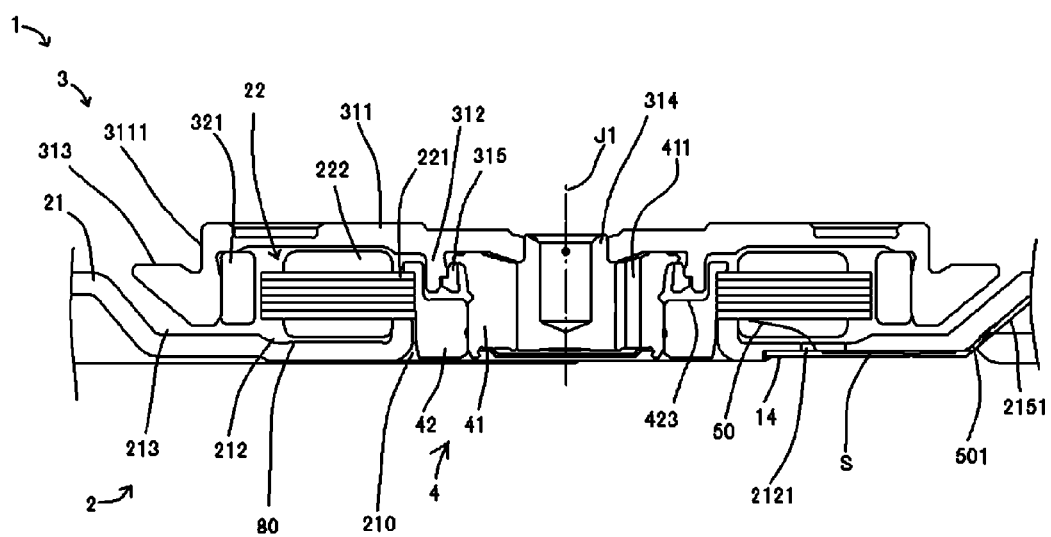
FIG. 1 is a cross-sectional view of a motor according to a preferred embodiment of the present invention.

FIG. 1 is a cross-sectional view of a spindle motor 1 according to a first exemplary preferred embodiment of the present invention. In the following description, the spindle motor 1 is simply called a motor 1. The motor 1 is preferably used, for example, in a 2.5-inch and about 7 or less mm-thick disk drive apparatus or a 2.5-inch and about 5 or less mm-thick disk drive apparatus (for example, hard disk drive apparatuses) or the like. The disk drive apparatus preferably includes the motor 1, a housing, at least one sheet of disk, an access unit, a connector, and the like. The disk is mounted to the motor 1. An actuator (not shown) preferably includes a head (not shown), an arm (not shown), and a head moving mechanism (not shown). The head approaches the disk and performs at least one of "reading" and "writing" of information. The arm supports the head. As the arm moves, the head moving mechanism moves the head relative to the disk. In this configuration, the head access a required position of the disk in a state of approaching the rotating disk. A base portion preferably defines a portion of the housing together with a cover member. The housing includes the motor 1, the disk, the access unit, and the like arranged therein.

As illustrated in FIG. 1, the motor 1 is preferably an outer rotor type. In this preferred embodiment, the motor 1 is a preferably three-phase motor having three phases including a U phase, a V phase, and a W phase. The motor 1 includes a stationary section 2 which is a fixed assembly, a rotor 3 which is a rotating assembly, and a fluid dynamic bearing mechanism (hereinafter, referred to as a "bearing mechanism 4"). The rotor is supported to be able to rotate with respect to the stationary section 2 about a center axis J1 of the motor 1 as the center by the bearing mechanism 4.

The stationary section 2 preferably includes a base portion 21, an annular stator portion 22, and a wiring board 14. A hole portion 210 is provided in the base portion 21 and penetrates through the base portion 21 in the axial direction. A cylindrical or substantially cylindrical bushing 42 is inserted into the hole portion 210. The bushing 42 is preferably fixed to the hole portion 210 by, for example, press-fitting, adhesion, welding, or the like.

The stator portion 22 includes a stator core 221 and a coil 222. The coil 222 is disposed in the stator core 221. In the stator portion 22, a plurality of lead-out wires 50 that lead out from the respective coils 222 of the U phase, the V phase, and the W phase are preferably electrically connected to the wiring board 14. Each of the lead-out wires is preferably connected to the wiring board 14 by, for example, soldering. In this preferred embodiment, the number of lead-out wires 50 is preferably 3.

As a preferred example of the wiring board 14, a flexible printed circuit board may be used, for example. The wiring board 14 is disposed at the lower surface of the base portion 21. A portion of the wiring board 14 may come into contact with the lower surface of the base portion 21 or may not come into contact with the lower surface of the base portion 21.

The stator core 221 is preferably obtained by performing punching work on, for example, a laminated steel sheet in which electromagnetic steel sheets are laminated in the axial direction. The stator core 221 preferably includes a core back (not shown) and a plurality of teeth (not shown). The core back is annular about the center axis J1 as the center. The stator core 221 is preferably fixed to the outer surface of the bushing 42 by, for example, press-fitting, caulking, or the like. The outer surface of the bushing 42 preferably opposes the inner surface of the core back in the radial direction and the outer surface of the stator core 221 in the radial direction.

The teeth extend outward in the radial direction from the outer periphery of the core back. The teeth preferably include a winding portion and a tip end portion. A conducting wire is wound around the winding portion to define the coil 222. The tip end portion widens on both sides in the circumferential direction from the outer edge portion of the winding portion.

As illustrated in FIG. 1, the rotor 3 preferably includes a rotor magnet 321, a disk portion 311, an extension portion 3111, a cylindrical portion 312, an annular disk placing portion 313, a shaft 314, and a stopper 315. The disk portion 311 is a substantially discoid member having a thin-film shape. The extension portion 3111 extends downward from the outer edge portion of the disk portion 311. The disk placing portion 313 widens outward in the radial direction from the lower portion of the extension portion 3111. A disk is placed on the disk placing portion 313. The rotor magnet 321 preferably is annular or substantially annular about the center axis J1 as the center. The rotor magnet 321 is disposed inside the extension portion 3111. The disk placing portion 313 is positioned outside the lower portion of the rotor magnet 321 in the radial direction. The rotor magnet 321 is disposed on the outer side in the radial direction of the stator portion 22. When the motor 1 is driven, a torque is generated between the rotor magnet 321 and the stator portion 22. The shaft 314 is preferably a columnar or substantially columnar or a cylindrical or substantially cylindrical member. The shaft 314 is fixed to the disk portion 311. When the rotor 3 is rotated, the shaft 314 is also rotated about the center axis J1. The stopper 315 preferably is a cylindrical or substantially cylindrical member. The stopper 315 is disposed on the inner side in the radial direction of the cylindrical portion 312.

As illustrated in FIG. 1, the bearing mechanism 4 is preferably a fluid dynamic bearing and includes a lubricating oil, a sleeve 41, and the bushing 42. The sleeve 41 preferably is a cylindrical substantially cylindrical member. The sleeve 41 is preferably, for example, a sintered metal obtained by sintering a powder metal. The sleeve 41 preferably includes a communication hole 411 extending through the sleeve 41 in the vertical direction. The lubricating oil is impregnated by the sleeve 41. As described above, the bushing 42 preferably has a cylindrical or substantially cylindrical shape. The sleeve 41 is inserted through the through-hole of the bushing 42. The inner surface of the bushing 42 supports the sleeve 41. An annular surface 423 which preferably is annular or substantially annular is disposed at the upper end portion in the axial direction of the bushing 42. In other words, the stationary section 2 includes the annular surface 423 which widens in the radial direction. The end portion on the outer side in the radial direction of the bushing 42 includes a cylindrical or substantially cylindrical side portion that opposes in the radial direction the stator core 221 that extends in the axial direction. The upper end portion in the axial direction of the cylindrical side portion includes a flange portion that extends outward in the radial direction. The flange portion opposes the upper surface of the stator core in the axial direction. Accordingly, the position in the axial direction of the stator core with respect to the bushing 42 is determined. When the rotor 3 is rotated with respect to the stationary section 2, the sleeve 41 rotatably supports the shaft 314 via the lubricating oil. The sleeve 41 may be, for example, a stainless-based metal or may be a copper-based metal. In addition, the type of the bearing mechanism 4 is not particularly limited, and other types of bearings including, for example, a ball bearing, a sliding bearing, etc. may also be used.

As illustrated in FIG. 1, the base portion 21 preferably includes the hole portion 210 and a first concave portion 212. The first concave portion 212 is disposed in the periphery of the hole portion 210. When viewed in the axial direction, the first concave portion 212 preferably has an annular or substantially annular shape about the center axis J1 as the center. The first concave portion 212 is recessed toward the lower surface side of the base portion 21 from the upper surface of the base portion 21. An insulating sheet 80 is preferably disposed in the first concave portion 212. The insulating sheet 80 is preferably annular or substantially annular about the center axis J1 as the center. The insulating sheet 80 opposes the coil 222 in the axial direction. The insulating sheet 80 opposes the side surface on the outer side in the radial direction of the first concave portion 212. Accordingly, the insulating sheet 80 is positioned in the first concave portion 212. Accordingly, even in a case where the coil 222 comes into contact with the base portion 21, electrical insulation is possible. In addition, a plurality of insulating sheets 80 may be arranged to be lined up in the circumferential direction to oppose the coil 222 in the axial direction. In this case, the shapes of the plurality of insulating sheets 80 may be various shapes including, for example, polygonal shapes such as rectangular and triangular shapes, circular shapes, elliptical shapes, and fan shapes and are not particularly limited. In addition, the insulating sheet 80 may be fixed to the base portion 21 via, for example, a bonding material or an adhesive, or may also be disposed in the first concave portion 212 without using them.

The second concave portion 213 is disposed along the first concave portion 212 on the outer side in the radial direction of the first concave portion 212. The second concave portion 213 is preferably recessed toward the lower surface side (the lower side in the axial direction) of the base portion 21 from the upper surface of the base portion 21. The second concave portion 213 preferably is annular or substantially annular about the center axis J1 as the center.

At least one through-hole 2121 is disposed in the first concave portion 212. The through-hole 2121 penetrates from the upper surface side of the base portion 21 toward the lower surface side of the base portion 21.

The bottom portion of the first concave portion 212 and the bottom portion of the second concave portion 213 protrude downward in the axial direction from the lower surface of the base portion 21. The bottom portion of the second concave portion 213 is positioned on the upper side in the axial direction rather than the bottom portion of the first concave portion 212. In other words, the bottom portion of the first concave portion 212 preferably protrudes downward in the axial direction from the bottom portion of the second concave portion 213. Each of the bottom portion of the first concave portion 212 and the bottom portion of the second concave portion 213 preferably has an annular or substantially annular shape about the center axis J1 as the center. A flat surface S is disposed at the lower surfaces on the lower side in the axial direction of the first concave portion 212 and the second concave portion 213. A lower tilted surface 2151 is disposed on the outer side in the radial direction of the second concave portion 213 in the lower surface of the base portion 21.

As illustrated in FIG. 1, the wiring board 14 is disposed at the lower surface of the base portion 21. The wiring board 14 is preferably fixed to the lower surface of the base portion 21 via, for example, a bonding material or an adhesive. A portion of the wiring board 14 is disposed on the flat surface S. The end portion of the wiring board 14 opposes in the radial direction the bottom portion of the first concave portion 212. The wiring board 14 abuts in the axial direction on a portion of the bottom portion of the first concave portion 212 and the bottom portion of the second concave portion 213. The wiring board 14 is guided to the outside in the radial direction through the flat surface S and extends in the lower surface of the base portion 21.

The lead-out wire 50 is led out from the coil 222. In this preferred embodiment, the motor 1 is preferably a three-phase motor. Therefore, a single lead-out wire 50 is led out from each of the U phase, the V phase, and the W phase. The lead-out wires 50 are led out from the upper surface side to the lower surface side of the base portion 21 through one or more respective through-holes 2121. The lead-out wires 50 extends on the lower surface side of the base portion 21 and are drawn to a position where the lower tilted surface 2151 is present. At the position where the lower tilted surface 2151 is present, the lead-out wires 50 are electrically connected to the wiring board 14. The lead-out wires 50 are preferably connected to the wiring board 14 by, for example, soldering (a lead-containing solder or a lead-free solder). A fixed portion 501 is preferably defined by the soldering. The lower tilted surface 2151 is positioned on the upper side in the axial direction rather than the bottom portion of the first concave portion 212 and the bottom portion of the second concave portion 213. Therefore, in a case where the lead-out wires 50 are connected to the wiring board 14 at the position where the lower tilted surface 2151 is present, the fixed portion 501 is positioned on the upper side in the axial direction rather than the bottom portion of the first concave portion 212. As a result, it is possible for the thickness of the motor 1 to be included in the thickness of the base portion 21.

At least a portion of the lower surface of the base portion 21 is preferably covered with a resin member. The lead-out wires 50 are preferably fixed by the resin member on the lower surface of the base portion 21 and the inside of each of the through-holes 2121 is blocked by the resin member. Accordingly, the lead-out wires 50 that pass through the respective through-holes 2121 are fixed into the respective through-holes 2121. Accordingly, even in a case where an impact is exerted on the motor 1 from the outside, each of the lead-out wires 50 is controlled from deviating from the wiring board 14 or the flat surface S. In addition, since each of the through-holes 2121 is covered with the resin member, infiltration of dust or the like into the motor 1 from the outside is controlled.

The base portion 21 is preferably formed by a process including, for example press working. First, the material, steel sheet is prepared. The steel sheet is a substantially plate shape. The steel sheet that is an original member is disposed in a mold. A series of press workings are performed on the original member. Accordingly, an intermediate product of the base portion 21 including the hole portion 210, the first concave portion 212, the second concave portion 213, and the like is molded.

Next, cutting or grinding is performed on the base portion 21 of the intermediate product. Accordingly, it is possible to thin the bottom portion of the first concave portion 212 and the bottom portion of the second concave portion 213 while preventing degradation of rigidity. As a result, the thickness of the disk drive apparatus including the motor 1 may be reduced.

In addition, the cutting or the grinding may be performed in a state where the base portion 21 is present in the mold or may also be performed after the intermediate member is released from the mold. Furthermore, the cutting or the grinding may also be performed on the entire upper surface and the entire lower surface of the base portion 21, the first concave portion 212, the second concave portion 213, the peripheral edge portion of the hole portion 210, and the like.

In the base portion 21 after the press work, sags and burrs are formed on the peripheral edge portion of the hole portion 210, the end portion of the through-hole 2121, the outer peripheral edge of the base portion 21, and the like by punching the original member in the mold. Sags are formed on one side in the punching direction of the mold, and burrs are formed on the other side in the punching direction. Particularly, cutting or grinding may be performed on the burrs formed by the press working. As the burrs are removed by the cutting, the peripheral edge portion of the hole portion 210, the end portion of the through-hole 2121, and the like are smoothed, and during assembly of the base portion 21 or the like, components such as the stator portion 22 are mounted without being damaged. In addition, as the press working is performed, on the lower surface side of the base portion 21, sags are formed in the peripheral edge portion of the hole portion 210.

In addition, press working may further be performed on the base portion 21 that is subjected to the cutting or the grinding.

Furthermore, plating is preferably performed on the base portion 21 that is subjected to the press working, the cutting, and the grinding. As the plating, for example, nickel-based plating is used. When the plating is performed, a thin film of the plating preferably covers the entirety of the base portion 21. The thickness of the thin film of the plating is preferably, for example, about 2 µm to about 10 µm. Therefore, corrosion of the base portion 21 due to the lubricating oil of the bearing mechanism 4, an external environment, and the like is controlled.

Figure 2:
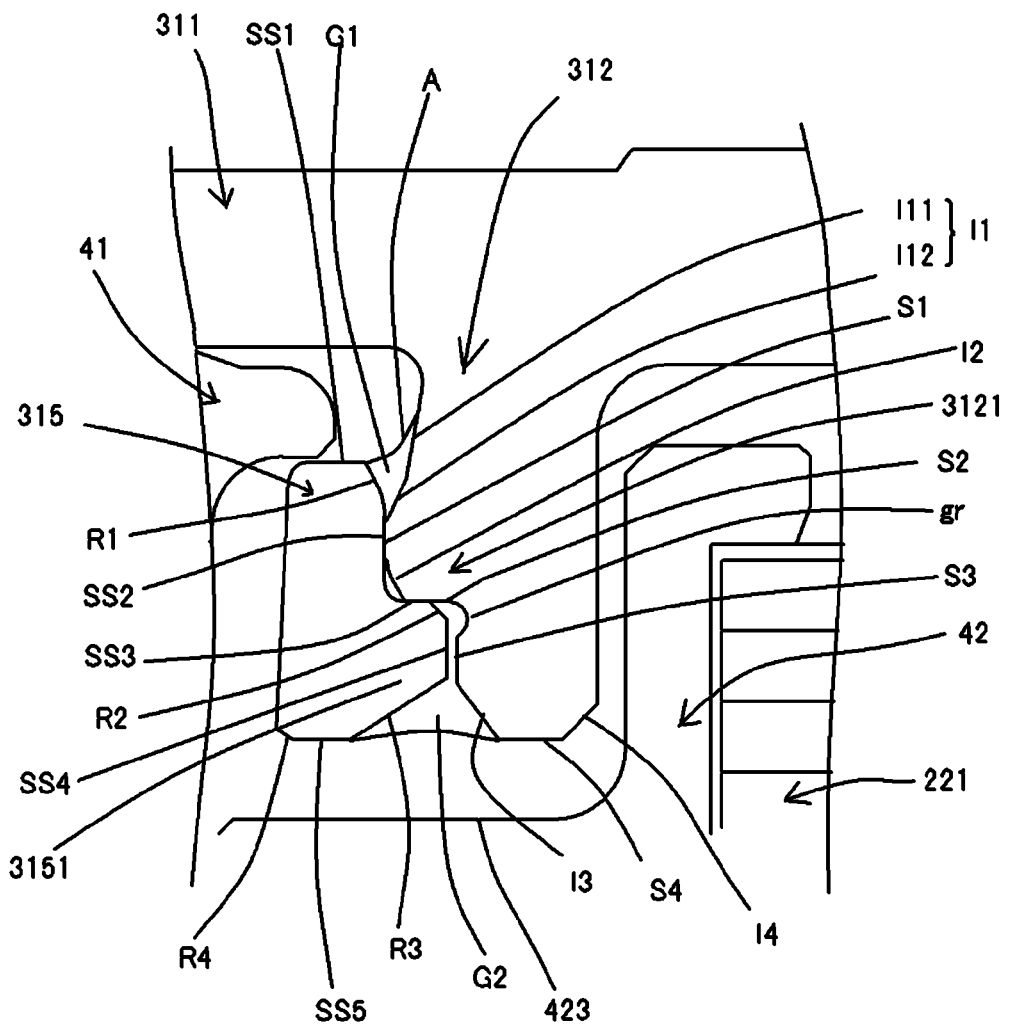
FIG. 2 is a partial cross-sectional view of the vicinity of a stopper portion in a preferred embodiment of the present invention.

FIG. 2 is a partial cross-sectional view illustrating the vicinity of the stopper 315. As illustrated in FIG. 2, the cylindrical portion 312 extends downward in the axial direction from the disk portion 311. The cylindrical portion 312 preferably includes a cylindrical portion protruding portion 3121. The cylindrical portion protruding portion 3121 protrudes inward in the radial direction from the inner surface of the cylindrical portion 312 and opposes the outer surface of the stopper 315 in the radial direction. In addition, in the preferred embodiment, the cylindrical portion 312 is preferably provided integrally with the disk portion 311 as a single monolithic member. However, the present invention is not limited to this preferred embodiment. For example, the cylindrical portion 312 and the disk portion 311 may be separate members.

A tilted surface I1 that is tilted with respect to the center axis J1 is preferably provided in the inner peripheral surface of the cylindrical portion protruding portion 3121. The space in the radial direction between the tilted surface I1 and the center axis J1 gradually decreases downward in the axial direction. The tilted surface I1 preferably includes a first tilted portion I11 and a second tilted portion I12. The first tilted portion I11 is positioned on the upper side in the axial direction rather than the second tilted portion I12. The tilt of the second tilted portion I12 with respect to the center axis J1 is greater than the tilt of the first tilted portion I11 with respect to the center axis J1. That is, an angle with respect to the center axis J1 of the second tilted portion I12 is greater than an angle with respect to the center axis J1 of the first tilted portion I11.

In addition, each of the first tilted portion I11 and the second tilted portion I12 may be a curved portion. Even in this case, the space in the radial direction between each of the first tilted portion I11 and the second tilted portion I12 and the center axis J1 gradually increases upward in the axial direction.

The cylindrical portion protruding portion 3121 preferably includes a surface S1 that is parallel or substantially parallel to the center axis J1. The surface S1 opposes the outer surface of the stopper 315 in the radial direction. In addition, it is preferable that the surface S1 be a flat surface. However, if so desired, the surface S1 may also be a surface having unevenness, a curved surface, or the like.

On the lower side in the axial direction of the surface S1, a tilted surface I2 that is tilted with respect to the center axis J1 is preferably disposed. The space in the radial direction between the tilted surface I2 and the center axis J1 gradually increases downward in the axial direction. The tilted surface I2 is connected to the surface S1. In addition, the tilted surface I2 may alternatively be a curved surface of which the space in the radial direction from the center axis J1 gradually increases downward in the axial direction. In other words, a tilted surface or a curved surface is defined in the end portion of the cylindrical portion protruding portion 3121 which opposes the stopper 315.

The cylindrical portion protruding portion 3121 preferably includes a surface S2 that is parallel or substantially parallel to the disk portion 311. The surface S2 is disposed on the outer side in the radial direction rather than the tilted surface I2. The surface S2 is connected to the tilted surface I2. It is preferable that the surface S2 is a flat surface. However, the surface S2 may also have unevenness, a curved surface, or the like.

Moreover, the cylindrical portion 312 preferably includes a surface S3. The surface S3 is disposed on the outer side in the radial direction rather than the surface S2. The surface S3 is parallel or substantially parallel to the center axis J1 and is connected to the surface S2. It is preferable that the surface S3 be a flat surface. However, the surface S3 may also have unevenness, a curved surface, or the like. A portion where the surfaces S2 and S3 are connected to each other is preferably provided with a groove portion gr. The groove portion gr is recessed outward in the radial direction from the surface S3.

The tip end portion of the cylindrical portion 312 preferably includes a tilted surface I3 that is tilted with respect to the center axis J1, and the space between the tilted surface I3 and the center axis J1 gradually increases downward in the axial direction. The tilted surface I3 is connected to the surface S3. In addition, the tilted surface I3 may also alternatively be a curved surface of which the space from the center axis J1 gradually increases downward in the axial direction.

A surface S4 that is parallel or substantially parallel to the disk portion 311 is disposed at the lower end portion of the cylindrical portion 312. The surface S4 is disposed on the outer side in the radial direction rather than the surface S2. The surface S4 is flush or substantially flush with the end portion on the lower side in the axial direction of the stopper 315. The surface S4 opposes the bushing 42 in the axial direction. In other words, the surface S4 opposes the annular surface 423 of the stationary section 2 in the axial direction. The surface S4 may also be disposed on the lower side in the axial direction or on the upper side in the axial direction rather than the end portion on the lower side in the axial direction of the stopper 315. It is preferable that the surface S4 be a flat surface. However, the surface S4 may also alternatively have unevenness, a curved surface, or the like.

On the outer side in the radial direction of the lower end portion of the cylindrical portion 312, a tilted surface I4 is preferably provided. The tilted surface I4 is tilted with respect to the center axis J1. The space between the tilted surface I4 and the center axis J1 gradually decreases downward in the axial direction. The tilted surface I4 is connected to the surface S4. The tilted surface I4 is connected to the outer surface of the cylindrical portion 312. In addition, the tilted surface I4 may also alternatively be a curved surface of which the space from the center axis J1 gradually increases upward in the axial direction.

The stopper 315 is disposed on the inner side in the radial direction of the cylindrical portion 312. The stopper 315 preferably includes a stopper protruding portion 3151 that protrudes outward in the radial direction. The stopper protruding portion 3151 opposes the inner surface of the cylindrical portion 312 in the radial direction. The stopper protruding portion 3151 opposes the cylindrical portion protruding portion 3121 in the axial direction. In FIG. 2, the cylindrical portion protruding portion 3121 is disposed on the upper side in the axial direction rather than the stopper protruding portion 3151.

A surface SS1 that is parallel or substantially parallel to the disk portion 311 is preferably disposed at the upper end portion of the stopper 315. At least a portion of the surface SS1 opposes the sleeve 41 in the axial direction. The inner peripheral surface of the stopper 315 is positioned on the inner side in the radial direction rather than the end portion on the outer side in the radial direction of the bearing mechanism 4. That is, the stopper 315 overlaps the bearing mechanism 4 in the axial direction. In addition, in the present preferred embodiment, the bearing mechanism 4 is a sleeve 41. Accordingly, even in a case where the rotor 3 moves in the axial direction due to an external impact or the like, the surface SS1 abuts on the sleeve 41 and the rotor 3 is prevented from being separated from the stationary section 2 in the axial direction. It is preferable that the surface SS1 is a flat surface. However, the surface SS1 may also have unevenness, be a curved surface, etc.

The space in the radial direction between the end portion on the outer side in the radial direction of the sleeve 41 and the cylindrical portion 312 is greater than the space in the axial direction between the sleeve 41 and the surface SS1 that opposes the sleeve 41. In addition, the gap in the axial direction between the end portion on the outer side in the radial direction of the sleeve 41 and the surface SS1 is disposed as a tapered gap of which the space in the axial direction gradually increases outward in the radial direction.

A surface R1 is preferably provided at a portion where the upper end portion of the outer surface of the stopper 315 opposes the inner surface of the cylindrical portion protruding portion 3121. In this preferred embodiment, the surface R1 is preferably a curved surface. The space between the curved surface R1 and the center axis J1 gradually increases downward in the axial direction. In addition, the surface R1 may also alternatively be a tilted surface that is tilted with respect to the center axis J1.

The upper end portion of the outer surface of the stopper 315 opposes in the radial direction the inner peripheral surface of the cylindrical portion protruding portion 3121. A first tapered gap G1 is a gap between the upper end portion of the outer surface of the stopper 315 and the inner surface of the cylindrical portion protruding portion 3121 that opposes the upper end portion of the outer surface of the stopper 315. In the first tapered gap G1, the gap in the radial direction widens upward in the axial direction. More specifically, in the first tapered gap G1, the space between the upper end portion of the outer surface of the stopper 315 and a curved surface that is a portion of the inner surface of the cylindrical portion protruding portion 3121 gradually increases upward in the axial direction.

A surface SS2 is preferably disposed at the outer surface of the stopper 315. The surface SS2 is preferably parallel or substantially parallel to the surface S1 of the cylindrical portion protruding portion 3121. The surface SS2 is parallel or substantially parallel to the center axis J1. The surface SS2 opposes the surface S1 of the cylindrical portion protruding portion 3121 in the radial direction. Accordingly, the stopper 315 is positioned with respect to the cylindrical portion 312.

A surface SS3 is preferably disposed at the upper end portion in the axial direction of the stopper protruding portion 3151. The surface SS3 is preferably parallel or substantially parallel to the disk portion 311. The surface SS3 is preferably parallel or substantially parallel to the surface S2 of the cylindrical portion protruding portion 3121. The surface SS3 opposes the surface S2 of the cylindrical portion protruding portion 3121 in the axial direction. As the surface SS3 comes into contact with the surface S2 in the axial direction, the stopper 315 is positioned in the axial direction with respect to the cylindrical portion 312. A portion where the surfaces SS2 and SS3 are connected to each other opposes the tilted surface of the cylindrical portion protruding portion 3121 in the radial direction and in the axial direction. The portion where the surfaces SS2 and SS3 are connected to each other is a curved surface.

The stopper protruding portion 3151 preferably further includes a tilted surface R2 that is tilted with respect to the center axis J1. The space in the radial direction between the tilted surface R2 and the center axis J1 gradually increases downward in the axial direction. The tilted surface R2 is disposed on the outer side in the radial direction rather than the surface SS3. The tilted surface R2 opposes the groove portion gr of the cylindrical portion protruding portion 3121 at least in the axial direction. The length in the axial direction of the tilted surface R2 is shorter than the length in the axial direction of the groove portion gr. In addition, the tilted length R2 may also alternatively be a curved surface of which the space in the radial direction from the center axis J1 gradually increases downward in the axial direction.

The stopper protruding portion 3151 preferably includes a surface SS4 that is parallel or substantially parallel to the center axis J1. The surface SS4 opposes the surface S3 of the cylindrical portion 312 in the radial direction. The surface SS4 is preferably parallel or substantially parallel to the surface S3. The surface SS4 is disposed on the outer side in the radial direction rather than the tilted surface R2. The surface SS4 is connected to the tilted portion R2. It is preferable that the surface SS4 be a flat surface. However, the surface SS4 may also alternatively be a surface having unevenness, a curved surface, etc.

A portion where the surface SS4 and the tilted surface R2 are connected to each other opposes the groove portion gr of the cylindrical portion protruding portion 3121 in the radial direction. The portion where the surface SS4 and the tilted surface R2 are connected to each other is positioned on the upper side in the axial direction rather than the portion where the groove portion gr of the cylindrical portion protruding portion 3121 is connected to the surface S3. In addition, as the surface SS4 comes into contact with the surface S3 in the radial direction, the stopper 315 may be positioned in the radial direction with respect to the cylindrical portion 312.

A tilted surface R3 that is tilted with respect to the center axis J1 is preferably disposed on the lower side in the axial direction of the stopper protruding portion 3151. The tilted surface R3 is disposed on the inner side in the radial direction rather than the surface SS4. The tilted surface R3 is connected to the surface SS4. The space between the tilted surface R3 and the center axis J1 gradually decreases downward in the axial direction. The tilted surface R3 of the stopper 315 opposes the tilted surface I3 of the cylindrical portion 312 in the radial direction. In addition, the tilted surface R3 may also alternatively be a curved surface of which the space from the center axis J1 gradually decreases downward in the axial direction.

The lower end portion of the outer surface of the stopper protruding portion 3151 opposes the inner peripheral surface of the cylindrical portion 312 in the radial direction via a second tapered gap G2. In the second tapered gap G2, the gap in the radial direction widens downward in the axial direction. More specifically, the space in the radial direction in the gap between the tilted surface R3 of the stopper protruding portion 3151 and the tilted surface I3 of the cylindrical portion 312 gradually increases downward in the axial direction. The second tapered gap G2 opposes the bushing 42 in the axial direction. In other words, the second tapered gap G2 opposes the annular surface 423 of the stationary section 2 in the axial direction. As illustrated in FIG. 2, the annular surface 423 is positioned below the second tapered gap G2.

A surface SS5 that is preferably parallel or substantially parallel to the disk portion 311 is disposed at the lower end portion of the stopper 315. The surface SS5 opposes the annular surface 423 of the stationary section 2 in the axial direction. The surface SS5 of the stopper 315 is flush or substantially flush with the surface S4 of the cylindrical portion 312. An oil-repellent agent is preferably applied onto the surface SS5.

A tilted surface R4 that is tilted with respect to the center axis J1 is preferably disposed on the inner side in the radial direction of the lower end portion of the stopper 315. The tilted surface R4 is disposed on the inner side in the radial direction rather than the surface SS5. The tilted surface R4 is connected to the surface SS5. The tilted surface R4 is connected to the inner surface of the stopper 315. The space in the radial direction between the tilted surface R4 and the center axis J1 gradually increases downward in the axial direction. The tilted surface R4 opposes the bushing 42 in the axial direction. In other words, the tilted surface R4 opposes the annular surface 423 of the stationary section 2 in the axial direction. The tilted surface R4 opposes the outer surface of the sleeve 41 in the radial direction.

The inner surface of the stopper 315 opposes the outer surface of the sleeve 41 in the radial direction. The space in the radial direction between the inner surface of the stopper 315 and the outer surface of the sleeve 41 gradually increases downward in the axial direction. More specifically, between the inner surface of the stopper 315, the outer peripheral surface of the sleeve 41, and the end portion on the outer side in the radial direction of the sleeve 41, a tapered gap of which the space in the radial direction gradually increases downward in the axial direction is disposed. The interface of the lubricating oil is preferably disposed between the outer peripheral surface of the sleeve 41 and the inner surface of the stopper 315. An oil-repellent agent is applied onto at least a portion of the outer surface of the sleeve 41. The interface of the lubricating oil is positioned on the upper side in the axial direction rather than the portion of the outer surface of the sleeve 41 to which the oil-repellent agent is applied. The stopper 315 opposes in the radial direction the sleeve 41 via the lubricating oil. Therefore, when an external impact or the like is exerted, the stopper 315 is prevented or substantially prevented from directly coming into contact with sleeve 41 and being damaged. In addition, since the tapered gap is disposed between the sleeve 41 and the stopper 315, dust or the like is controlled from infiltrating into the inner peripheral surface of the through-hole of the sleeve 41 via the space between the outer peripheral surface of the sleeve 41 and the inner surface of the stopper 315. Moreover, since the interface of the lubricating oil is disposed in the tapered gap disposed between the sleeve 41 and the stopper 315, an operator is able to view the interface of the lubricating oil as the rotor 3 is viewed from the lower side in the axial direction when the motor 1 is assembled. Therefore, the operator may confirm whether or not the bearing mechanism 4 is filled with an appropriate amount of the lubricating oil by using, for example, a jig, a device, or the like by viewing the interface of the lubricating oil. In addition, the amount of the lubricating oil filled in the bearing mechanism 4 may also be confirmed by an automated equipment or the like instead of an operator using the interface of the lubricating oil.

An adhesive A is included between the cylindrical portion 312 and the stopper 315. The adhesive A is preferably included in at least a portion of the first tapered gap G1 and in at least a portion of the second tapered gap G2. At least a portion of the interface of the adhesive A on the upper side in the axial direction is in the first tapered gap G1. The adhesive A comes into contact with a portion of the tilted surface I1 in the first tapered gap G1. In this preferred embodiment, the adhesive A comes into contact with the first tilted portion I11 and the second tilted portion I12. That is, a portion of the adhesive A is disposed on the upper side in the axial direction rather than the first tapered gap. In the first tapered gap G1, the interface of the adhesive A is positioned on the upper side in the axial direction rather than the second tilted portion I12. In addition, the interface of the adhesive A on the lower side in the axial direction is disposed in the second tapered gap G2.

In addition, in the first tapered gap G1, the interface of the adhesive A may be disposed on the second tilted portion I12 or on the lower side in the axial direction rather than the second tilted portion I12.

The adhesive A is applied to at least any one of the cylindrical portion 312 and the stopper 315. Thereafter, the stopper 315 approaches relative to the cylindrical portion 312, and at least a portion of the stopper 315 comes into contact with the cylindrical portion 312. As a result, the stopper 315 is fixed to the cylindrical portion 312.

In addition, the stopper 315 may also be fixed to the cylindrical portion 312 by other methods including, for example, adhesion, fusion, press-fitting, caulking, and the like.

As described above, the adhesive A is included between the cylindrical portion 312 and the stopper 315. Therefore, when the stopper 315 approaches the cylindrical portion 312, at least a portion of the adhesive A moves upward and downward in the axial direction in the gap between the cylindrical portion 312 and the stopper 315. The width in the radial direction of the first tapered gap G1 gradually increases upward in the axial direction. Accordingly, the interface of the adhesive A is positioned in the first tapered gap G1.

In addition, the tilted surface I1 is disposed in the cylindrical portion protruding portion 3121. Therefore, even in a case where the adhesive A protrudes from the first tapered gap G1, the interface of the adhesive A is disposed to follow the tilted surface I1. That is, the adhesive A opposes the sleeve 41 in the radial direction. Accordingly, blocking of the sleeve 41, a tapered seal defined in the sleeve 41 and the gap in the axial direction between the disk portion 311 and the sleeve 41, a tapered seal defined in the gap in the axial direction between the sleeve 41 and the stopper 315, and the like by the adhesive A may be controlled. As a result, even in a case where the lubricating oil leaks out from the sleeve 41 or the like, the lubricating oil stays in at least one of the tapered seals, and thus the lubricating oil may be prevented from leaking out toward the stator.

In addition, the width in the radial direction of the second tapered gap G2 gradually increases downward in the axial direction. Therefore, even in a case where the stopper 315 approaches the cylindrical portion 312 and the adhesive A moves downward in the axial direction in the gap between the cylindrical portion 312 and the stopper 315, the adhesive A is prevented from protruding from the second tapered gap G2.

In addition, as illustrated in FIG. 2, in the axial direction, the cross-sectional area of the second tapered gap G2 is preferably wider than the cross-sectional area of the first tapered gap G1 such that, when the motor 1 is assembled, the operator may easily confirm whether or not the interface of the adhesive A is positioned in the second tapered gap G2. In addition, it is preferable that the adhesive A be made fluorescent by UV irradiation. In this case, the operator may visually and further easily confirm the interface of the adhesive. Furthermore, even though the interface of the adhesive A is not visually confirmed by the operator it is possible that, for example, recognition of the interface of the adhesive A by a device may be used.

Figure 3:
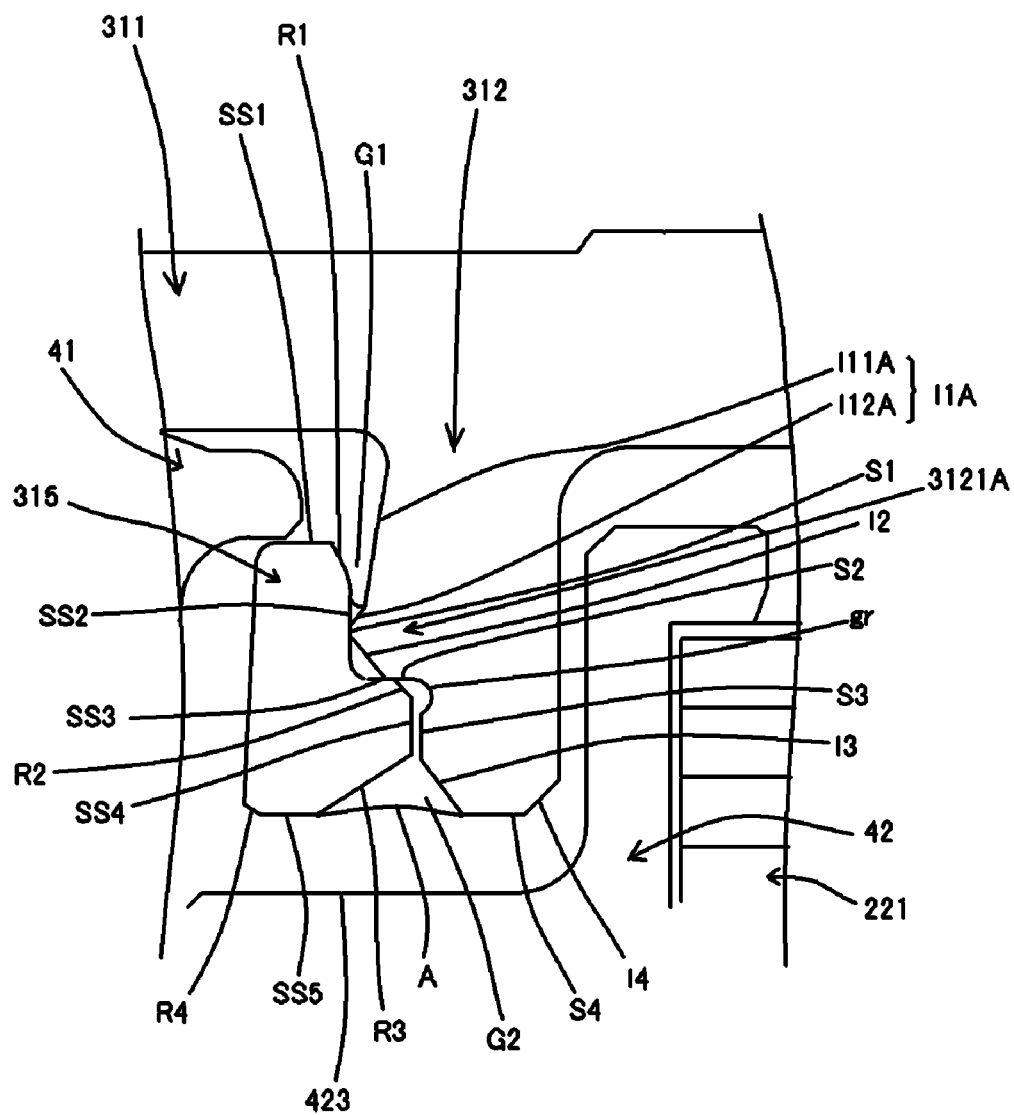
FIG. 3 is a partial cross-sectional view of the vicinity of the stopper, illustrating a modified example of a preferred embodiment of the present invention.

FIG. 3 is a partial cross-sectional view illustrating a modified example of a preferred embodiment of the present invention showing the vicinity of the stopper 315. In the structure illustrated in FIG. 3, the structure of the cylindrical portion protruding portion 3121 illustrated in FIG. 2 is different. In FIG. 3, the cylindrical portion 312 preferably includes a cylindrical portion protruding portion 3121A. The inner surface of the cylindrical portion 312 preferably includes a tilted surface I1A that is tilted with respect to the center axis J1. The tilted surface I1A defines a portion of the cylindrical portion protruding portion 3121A. The tilted surface I1A preferably includes a first tilted portion I11A and a second tilted portion I12A.

The first tilted portion I11A extends downward in the axial direction from the lower end of the disk portion 311 along the inner surface of the cylindrical portion 312. The first tilted portion I11A is tilted with respect to the center axis J1. The second tilted portion I12A is tilted with respect to the center axis J1. The second tilted portion I12A is disposed on the lower side in the axial direction rather than the tilted surface R1 of the stopper 315. The first tilted portion I11A is connected to the second tilted portion I12A. A portion where the first tilted portion I11A and the second tilted portion I12A are connected to each other is positioned on the lower side in the axial direction rather than the tilted surface R1 and opposes the surface SS2 of the stopper 315 in the radial direction. Therefore, in the first tapered gap G1, the interface of the adhesive A is disposed on the lower side in the axial direction rather than the tilted portion R1 of the stopper 315. As a result, the adhesive A is more likely to stay in the first tapered gap G1 and thus the adhesive A is preferably prevented from adhering to other members such as the sleeve 41.

In addition, at least a portion of the tilted surface I1A may also alternatively be a curved surface. In this case, at least one of the first tilted portion I11A and the second tilted portion I12A may also be a curved surface.

Figure 4:
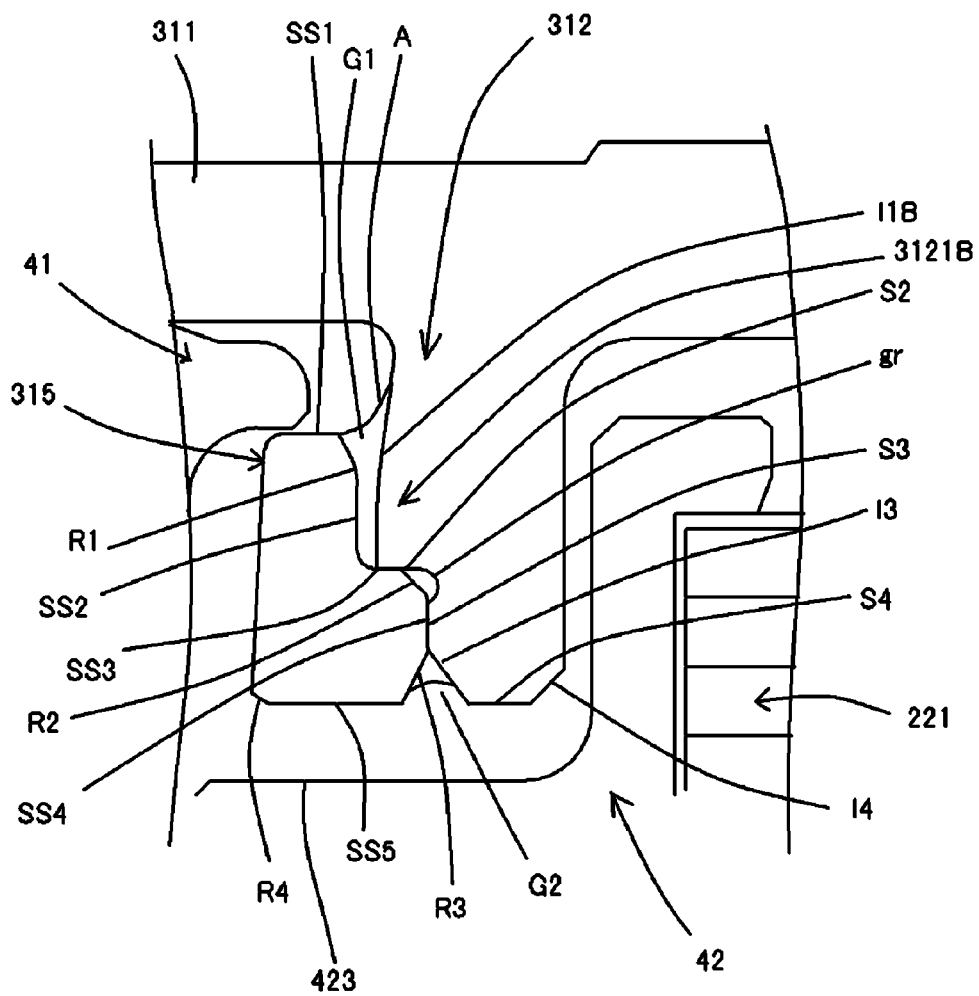
FIG. 4 is a partial cross-sectional view of the vicinity of the stopper, illustrating a modified example of a preferred embodiment of the present invention.

FIG. 4 is a partial cross-sectional view illustrating the vicinity of the stopper 315 according to another modified example of a preferred embodiment of the present invention. In FIG. 4, unlike the above-described preferred embodiments and the like, a cylindrical portion protruding portion 3121B preferably does not include the flat surface S1, the first tilted portion, and the second tilted portion. In FIG. 4, the cylindrical portion protruding portion 3121B preferably includes a tilted portion I1B. The tilted portion I1B extends downward in the axial direction from the disk portion 311 along the inner surface of the cylindrical portion 312. The tilted portion I1B is connected to the surface S2. The space in the radial direction between the tilted portion I1B and the center axis J1 gradually decreases downward in the axial direction.

In addition, at least a portion of the tilted portion I1B may also be a flat portion. In addition, at least a portion of the tilted portion I1B may also be a portion where the space in the radial direction from the center axis J1 gradually increases downward in the axial direction.

The tilted portion I1B opposes in the radial direction the surface R1 of the stopper 315 via the gap. The tilted portion I1B opposes in the radial direction the surface SS2 via the gap. The tilted surface I1B of the cylindrical portion 312 opposes the outer surface of the stopper 315 that includes the surface R1 and the surface SS2 of the stopper 315 via the first tapered gap G1.

In addition, as illustrated in FIG. 4, the surface SS4 of the stopper 315 abuts on the surface S3 of the cylindrical portion 312 in the radial direction. Therefore, the stopper 315 is positioned with respect to the cylindrical portion 312 in the radial direction. The surface SS3 of the stopper 315 abuts on the surface S2 of the cylindrical portion 312 in the axial direction. Therefore, the stopper 315 is positioned with respect to the cylindrical portion 312 in the axial direction.

In addition, the tilted portion I1B may also alternatively be a curved surface. That is, the tilted portion I1B may also be a curved surface of which the space in the radial direction from the center axis J1 gradually decreases downward in the axial direction. Otherwise, the tilted portion I1B may also be a curved surface that is recessed outward in the radial direction.

The adhesive A is preferably included between the stopper 315 and the cylindrical portion 312. In a portion of the interface of the adhesive A, at least a portion thereof is disposed on the tilted portion I1B. In addition, the portion of the interface of the adhesive A may also be disposed between the tilted portion I1B and the surface R1 of the stopper 315 or between the tilted portion I1B and the surface SS2 of the stopper 315.

Figure 5:
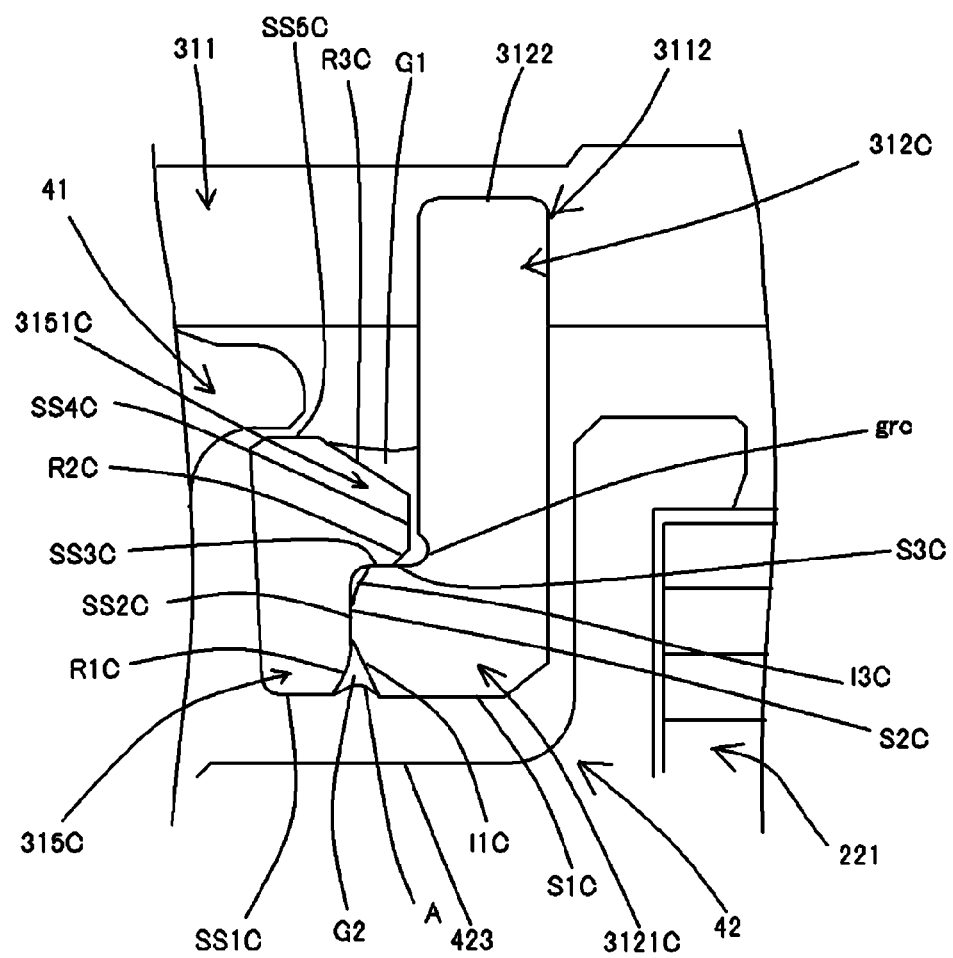
FIG. 5 is a partial cross-sectional view of the vicinity of the stopper, illustrating a modified example of a preferred embodiment of the present invention.

FIG. 5 is a partial cross-sectional view of a stopper 315C, illustrating yet another modified example of a preferred embodiment of the present invention. In FIG. 5, a cylindrical portion 312C is preferably provided as a separate member from the disk portion 311. In the lower surface of the disk portion 311, at least one concave portion 3112 that is recessed upward in the axial direction is disposed. In the upper end portion in the axial direction of the cylindrical portion 312C, a convex portion 3122 corresponding to the shape of the concave portion of the disk portion 311 is preferably provided. The convex portion 3122 of the cylindrical portion 312C is preferably fitted into a concave portion 3112 of the disk portion 311. The width in the radial direction of the convex portion 3122 is greater than the width in the radial direction of the concave portion 3112. Therefore, the convex portion 3122 of the cylindrical portion 312C is fixed to the concave portion 3112 of the disk portion 311 by, for example, press-fitting.

In addition, the width in the radial direction of the convex portion 3122 may be the same as or smaller than the width in the radial direction of the concave portion 3112. In this case, it is preferable that the cylindrical portion 312C is fixed to the disk portion 311 by, for example, applying the adhesive A, by welding, or the like.

A cylindrical portion protruding portion 3121C is preferably arranged at the lower end portion in the axial direction of the cylindrical portion 312C. The cylindrical portion protruding portion 3121C protrudes inward in the radial direction and opposes the outer surface of the stopper 315C in the radial direction. The cylindrical portion protruding portion 3121C preferably includes a surface S1C. The surface S1C is disposed at the lower end portion in the axial direction of the cylindrical portion protruding portion 3121C. The surface S1C is a surface that is parallel or substantially parallel to the disk portion 311. The cylindrical portion protruding portion 3121C has a tilted surface I1C that is tilted with respect to the center axis J1. The space in the radial direction between the tilted surface I1C and the center axis J1 gradually decreases upward in the axial direction. The tilted surface I1C is connected to the surface S1C. The tilted surface I1C is disposed on the inner side in the radial direction rather than the surface S1C.

In addition, the tilted surface I1C may also alternatively be a curved surface. That is, the tilted surface I1C may also be a curved surface of which the space in the radial direction from the center axis J1 gradually decreases upward in the axial direction. In this case, the tilted surface I1C may have a shape that is recessed outward in the radial direction or is convex toward the inner side in the radial direction.

The cylindrical portion protruding portion 3121C preferably includes a surface S2C that is parallel or substantially parallel to the center axis J1. The surface S2C opposes the outer surface of the stopper 315 in the radial direction. The surface S2C is connected to a tilted surface I3C. The surface S2C is connected to the tilted surface I1C. The surface S2C is disposed on the inner side in the radial direction rather than the tilted surface I1C. It is preferable that the surface S2C be a flat surface. The surface S2C may not necessarily be a flat surface and may alternatively have unevenness, a curved portion, etc. disposed therein.

The cylindrical portion protruding portion 3121C preferably includes the tilted surface I3C that is tilted with respect to the center axis J1. The space in the radial direction between the tilted surface I3C and the center axis J1 gradually increases upward in the axial direction. The tilted surface I3C opposes the outer surface of the stopper 315 in the radial direction. The tilted surface I3C is connected to the surface S2C. The tilted surface I3c is disposed on the outer side in the radial direction rather than the surface S2C.

In addition, the tilted surface I3C may also be a curved surface of which the space from the center axis J1 gradually increases upward in the axial direction.

The cylindrical portion protruding portion 3121C preferably includes a surface S3C that is parallel or substantially parallel to the disk portion 311. The surface S3C is disposed at the upper end portion in the axial direction of the cylindrical portion protruding portion 3121C. The surface S3C is connected to the tilted surface I3C. The surface S3C is parallel or substantially parallel to the surface S1C. A portion where the surface S3C is connected to the inner surface of the cylindrical portion 312C, a groove portion grc that is recessed outward in the radial direction is disposed.

The lower end portion in the axial direction of the stopper 315C preferably includes a surface SS1C that is parallel or substantially parallel to the disk portion 311. The surface SS1C is flush or substantially flush with the surface S1C of the cylindrical portion 312C. An oil-repellent agent is applied to the surface SS1C and the surface S1C. In addition, the oil-repellent agent may be applied at least any one of the surface SS1C and the surface S1C, may be applied only to the surface SS1C, or may be applied only to the surface S1C. The surface SS1C opposes the bushing 42 in the axial direction. That is, the surface SS1C opposes the annular surface 423 of the stationary section 2 in the axial direction.

In addition, the surface SS1C may not necessarily be flush with the surface S1C of the cylindrical portion 312C. The surface SS1C may also alternatively be disposed on the upper side in the axial direction or on the lower side in the axial direction rather than the surface S1C of the cylindrical portion 312C.

The lower end portion of the stopper 315C preferably includes a curved portion R1C. The curved portion R1C is disposed at the outer surface of the lower end portion of the stopper 315C. The space in the radial direction between the curved portion R1C and the center axis J1 gradually increases upward in the axial direction. The curved portion R1C opposes in the radial direction the tilted surface I1C of the cylindrical portion protruding portion 3121.

In addition, the curved portion R1C may also be a tilted surface that is tilted with respect to the center axis J1. Even in this case, it is preferable that the space in the radial direction between the surface R1C and the center axis J1 gradually increase upward in the axial direction.

The stopper 315C preferably includes a surface SS2C that is parallel or substantially parallel to the center axis J1. The surface SS2C is disposed on the outer side in the radial direction rather than the surface SS1C. The surface SS2C is connected to the curved portion R1C. The surface SS2C opposes in the radial direction the surface S2C of the cylindrical portion protruding portion 3121. The surface SS2C of the stopper 315 opposes in the radial direction the surface S2C of the cylindrical portion protruding portion 3121. In the modified example illustrated in FIG. 5, the surface SS2C comes into contact with the surface S2C of the cylindrical portion protruding portion 3121C. Accordingly, the stopper 315C is positioned with respect to the cylindrical portion 312C in the radial direction.

The lower end portion in the axial direction of a stopper protruding portion 3151C preferably includes a surface SS3C that is parallel or substantially parallel to the disk portion 311. The lower end portion in the axial direction of the stopper protruding portion 3151C opposes in the axial direction the upper end portion in the axial direction of the cylindrical portion protruding portion 3121C. More specifically, the surface SS3C of the stopper protruding portion 3151C oppose the surface S3C of the cylindrical portion protruding portion 3121C in the axial direction. In the modified example of FIG. 5, the surface SS3C comes into contact with the surface S3C in the axial direction. Therefore, the stopper 315C is positioned with respect to the cylindrical portion 312C in the axial direction. The surface SS3C is connected to the surface SS2C.

The stopper protruding portion 3151C preferably includes a tilted portion R2C that is tilted with respect to the center axis J1. The space in the radial direction between the tilted portion R2C and the center axis J1 gradually increases upward in the axial direction. The tilted portion R2C opposes the groove portion grc of the cylindrical portion 312C at least in the radial direction.

In addition, the tilted portion R2C may also alternatively be a curved surface of which the space in the radial direction from the center axis J1 gradually increases upward in the axial direction.

A portion where the surface SS3 is connected to the tilted surface R2C is disposed on the lower side in the axial direction rather than a portion where the inner surface of the cylindrical portion 312C is connected to the end portion of the groove portion grc.

The stopper protruding portion 3151C preferably includes a surface SS4C that is parallel or substantially parallel to the center axis J1. The surface SS4C is disposed at the end portion on the outer side in the radial direction of the stopper protruding portion 3151C. The surface SS4C opposes the inner surface of the cylindrical portion 312C in the radial direction. A portion where the surface SS4C is connected to the tilted portion R2C opposes the groove portion grc of the cylindrical portion 312C in the radial direction.

In addition, the surface SS4C is preferably a flat surface but may not necessarily be the flat surface and may also alternatively be uneven or a curved portion. The surface SS4C may also abut on the inner surface of the cylindrical portion 312C. Accordingly, the stopper 315C is also positioned with respect to the cylindrical portion 312C in the radial direction.

A tilted portion R3C that is tilted with respect to the center axis J1 is preferably disposed at the upper end portion in the axial direction of the stopper protruding portion 3151C. The space in the radial direction between the tilted portion R3C and the center axis J1 gradually decreases upward in the axial direction. The tilted portion R3C is disposed on the inner side in the radial direction rather than the surface SS4C. The tilted portion R3C opposes the inner surface of the cylindrical portion 312C in the radial direction. In addition, the tilted portion R3C may also alternatively be a curved surface or the tilted portion R3C may also have at least two tilted portions that are tilted with respect to the center axis J1.

The stopper 315C preferably includes a surface SS5C that is parallel or substantially parallel to the disk portion 311. The surface SS5C is connected to the tilted surface R3C. The surface SS5C opposes at least a portion of the end portion on the outer side in the radial direction of the sleeve 41. Accordingly, when the rotor 3 moves in the axial direction with respect to the stationary section 2, the rotor 3 comes into contact with the sleeve 41 and thus the rotor 3 is preferably prevented from being separated from the stationary section 2 in the axial direction.

The upper end portion of the outer surface of the stopper protruding portion 3151C opposes the inner peripheral surface of the cylindrical portion 312C via the first tapered gap G1. In the first tapered gap G1, the gap in the radial direction decreases downward in the axial direction. More specifically, the space in the radial direction of the gap between the tilted surface R3C of the stopper protruding portion 3151C and the inner surface of the cylindrical portion 312C gradually decreases downward in the axial direction. The first tapered gap G1 opposes the lower surface of the disk portion 311 in the axial direction.

The outer peripheral surface of the stopper 315C opposes the inner peripheral surface of the cylindrical portion protruding portion 3121C via the second tapered gap G2. In the second tapered gap G2, the gap in the radial direction increases downward in the axial direction. More specifically, the space in the radial direction of the gap between the tilted surface R1C of the stopper 315C and the tilted surface I1C of the cylindrical portion protruding portion 3121C gradually increases downward in the axial direction. The second tapered gap G2 opposes the bushing 42 in the axial direction. That is, the second tapered gap G2 opposes the annular surface 423 of the stationary section 2 in the axial direction.

The adhesive A is preferably included between the stopper 315C and the cylindrical portion 312C. At least a portion of the interface of the adhesive A is disposed in each of the first tapered gap G1 and the second tapered gap G2. It is preferable that the interface of the adhesive A disposed in the first tapered gap G1 be disposed on the lower side in the axial direction rather than the surface SS5C which is the upper end portion of the stopper 315. That is, it is preferable that the interface of the adhesive A disposed in the first tapered gap G1 be disposed on the lower side in the axial direction rather than the surface SS5C of the stopper 315.

It is preferable that the interface of the adhesive A disposed in the second tapered gap G2 be disposed on the upper side in the axial direction rather than the lower end portion in the axial direction of the stopper protruding portion 3151C and the lower end portion in the axial direction of the cylindrical portion protruding portion 3121C. That is, it is preferable that the interface of the adhesive A disposed in the second tapered gap G2 be disposed on the upper side in the axial direction rather than the surface SS1C of the stopper protruding portion 3151C and the surface S1C of the cylindrical portion 312C.

In addition, in the axial direction, the cross-sectional area of the first tapered gap G1 is greater than the cross-sectional area of the second tapered gap G2. Accordingly, a larger amount of the adhesive A included between the stopper 315C and the cylindrical portion 312C is disposed close to the first tapered gap G1. As a result, the adhesive A is preferably prevented from leaking out from the lower side in the axial direction from the second tapered gap G2.

In addition, in the modified example illustrated in FIG. 5, the concave portion 3112 is disposed in the disk portion 311. However, in the disk portion 311, instead of the concave portion 3112, at least one through-hole that penetrates through the disk portion 311 in the axial direction may alternatively be disposed. The convex portion 3122 of the cylindrical portion 312C is inserted into the through-hole such that the cylindrical portion 312C is fixed to the disk portion 311 by, for example, press-fitting, welding, adhesion, caulking, or the like.

Moreover, in the disk portion 311, a plurality of concave portions 3112, through-holes, or a combination thereof may be disposed. In this case, the shape of the convex portion 3122 which is the upper end portion in the axial direction of the cylindrical portion 312C is arranged to fit the shape of the concave portion 3112 or the through-hole. In addition, the cylindrical portion 312C is fixed to the disk portion 311 by, for example, press-fitting, adhesion, welding, caulking, a combination thereof, or the like. In addition, the disk portion 311 may also be fixed to the cylindrical portion 312C by other methods.

While the preferred embodiments according to the present invention have been described above, various modifications of the present invention other than those described above can be made.

For example, each of the tilted surfaces of the cylindrical portions 312 and 312C may not necessarily be a tilted surface that is tilted with respect to the center axis. At least any one of the tilted surfaces may be a curved surface of which the space in the radial direction from the center axis J1 changes upward or downward in the axial direction.

The upper end portions and the lower end portions in the axial direction of the stoppers 315 and 315C may not necessarily be parallel or substantially parallel to the disk portion 311. The tilting of the upper end portions and the lower end portions of the stoppers 315 and 315C with respect to the center axis J1 may be different from each other. The lower end portion in the axial direction of the cylindrical portion 312 may not necessarily be parallel or substantially parallel to the disk portion 311. The tilting of the lower end portion in the axial direction of the cylindrical portion 312, the upper end portion of the stopper 315, and the lower end portion of the stopper 315 with respect to the center axis J1 may be different from each other or the same tilts may be included. The stopper protruding portion 3151 may not necessarily be parallel or substantially parallel to the inner surface of the cylindrical portion 312 and the tilting thereof with respect to the center axis J1 may be different from each other.

The oil-repellent agent may also be applied not only to the outer surface of the sleeve 41 but also to the inner surface of the stopper 315. The oil-repellent agent may also be applied to the lower surface of the disk portion 311.

In addition, as described above, the motor 1 is preferably a three-phase motor. However, the number of phases of the motor does not need to be particularly limited, and for example, a multi-phase motor such as. for example, a single-phase, five-phase, or seven-phase motor may be provided. The number of through-holes 2121 disposed in the first concave portion 214 may be determined depending on the number of lead-out wires and a method of processing common wires.

The preferred embodiments of the present invention and the modifications thereof may be used for a motor for a disk drive apparatus and may also be used for a motor in applications other than the disk drive apparatus, for example.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor comprising:
a stator; and
a rotor which is arranged to rotate relative to the stator about a center axis as a center; wherein the rotor includes:
a disk portion;
a cylindrical portion which extends downward in an axial direction from the disk portion; and
a stopper that is cylindrical or substantially cylindrical, is disposed on an inner side in a radial direction of the cylindrical portion and is fixed to an inner surface of the cylindrical portion;
the cylindrical portion includes a cylindrical portion protruding portion which protrudes inward in the radial direction and opposes an outer surface of the stopper in the radial direction;
the stopper includes a stopper protruding portion which protrudes outward in the radial direction, opposes the inner surface of the cylindrical portion, and opposes the cylindrical portion protruding portion in the axial direction;
an adhesive is included between the cylindrical portion and the stopper;
a gap in the radial direction between an upper end portion of the outer surface of the stopper and an inner peripheral surface of the cylindrical portion protruding portion defines a first tapered gap in which a gap in the radial direction widens upward in the axial direction;
a gap in the radial direction between a lower end portion of the outer surface of the stopper protruding portion and an inner peripheral surface of the cylindrical portion defines a second tapered gap in which a gap in the radial direction widens downward in the axial direction;
the adhesive is included in at least a portion of the first tapered gap and in at least a portion of the second tapered gap;
the stator includes an annular surface that widens in the radial direction; and
the annular surface is positioned below the second tapered gap and the second tapered gap opposes the annular surface in the axial direction.

2. The motor according to claim 1, wherein
the inner peripheral surface of the cylindrical portion protruding portion which opposes in the radial direction the upper end portion of the outer surface of the stopper includes a tilted surface that is tilted with respect to the center axis; and
the tilted surface includes:
a first tilted portion that is tilted with respect to the center axis; and
a second tilted portion having a tilt angle with respect to the center axis, which is greater than that of the first tilted portion.

3. The motor according to claim 1, wherein a portion of the adhesive is disposed on an upper side in the axial direction rather than the first tapered gap.

4. The motor according to claim 1, wherein an end portion of the cylindrical portion protruding portion which opposes the stopper includes a tilted surface or a curved surface.

5. The motor according to claim 1, wherein a tip end portion of the cylindrical portion includes a tilted surface or a curved surface of which a space in the radial direction from the center axis increases downward in the axial direction.

6. The motor according to claim 1, wherein the cylindrical portion protruding portion includes a flat surface that is parallel or substantially parallel to the center axis.

7. The motor according to claim 1, wherein a concave portion that is recessed outward in the radial direction is disposed in a portion where the cylindrical portion protruding portion is connected to the inner surface of the cylindrical portion.

8. The motor according to claim 1, wherein a tilted surface or a curved surface of which a space in the radial direction from the center axis increases downward in the axial direction is defined in a portion of the outer surface of the stopper which opposes the cylindrical portion protruding portion.

9. The motor according to claim 1, wherein the stopper protruding portion includes a flat surface that is parallel or substantially parallel to the center axis.

10. The motor according to claim 1, wherein the stopper protruding portion includes a tilted surface or a curved surface of which a space in the radial direction from the center axis decreases downward in the axial direction.

11. The motor according to claim 1, wherein at least any one of end portions on a lower side in the axial direction and on an upper side in the axial direction of the stopper is parallel or substantially parallel to the disk portion.

12. The motor according to claim 1, wherein the cylindrical portion protruding portion includes a surface that is parallel or substantially parallel to the stopper protruding portion.

13. The motor according to claim 1, wherein
the stator includes a bearing mechanism which supports the rotor; and
an inner surface of the stopper is positioned on an inner side in the radial direction rather than an end portion on an outer side in the radial direction of the bearing mechanism.

14. The motor according to claim 13, wherein a portion of the adhesive opposes the bearing mechanism in the radial direction.

15. The motor according to claim 13, wherein a portion of the stopper opposes the bearing mechanism in the axial direction.

16. The motor according to claim 1, wherein a cross-sectional area of the second tapered gap in the axial direction is greater than a cross-sectional area of the first tapered gap.

17. The motor according to claim 1, wherein the cylindrical portion is integrally provided with the disk portion as a single monolithic member.

18. The motor according to claim 1, wherein
the disk portion includes at least one through-hole or concave portion;
the cylindrical portion includes a convex portion corresponding to the through-hole; and
the convex portion is disposed in the through-hole or the concave portion.

19. The motor according to claim 18, wherein the convex portion is disposed in the through-hole or the concave portion, and the cylindrical portion is fixed to the disk portion by at least any one of press-fitting, caulking, adhesion, and welding.

20. The motor according to claim 1, wherein the cylindrical portion is fixed to the disk portion by welding.

21. A disk drive apparatus comprising:
the motor according to claim 1;
at least one sheet of disk mounted to the rotor; and
a housing which accommodates the motor and the disk.

* * * * *